Feb. 22, 1955     C. E. ANDERSHOCK     2,702,619
OVERLOAD SLIP CLUTCH
Filed July 18, 1951
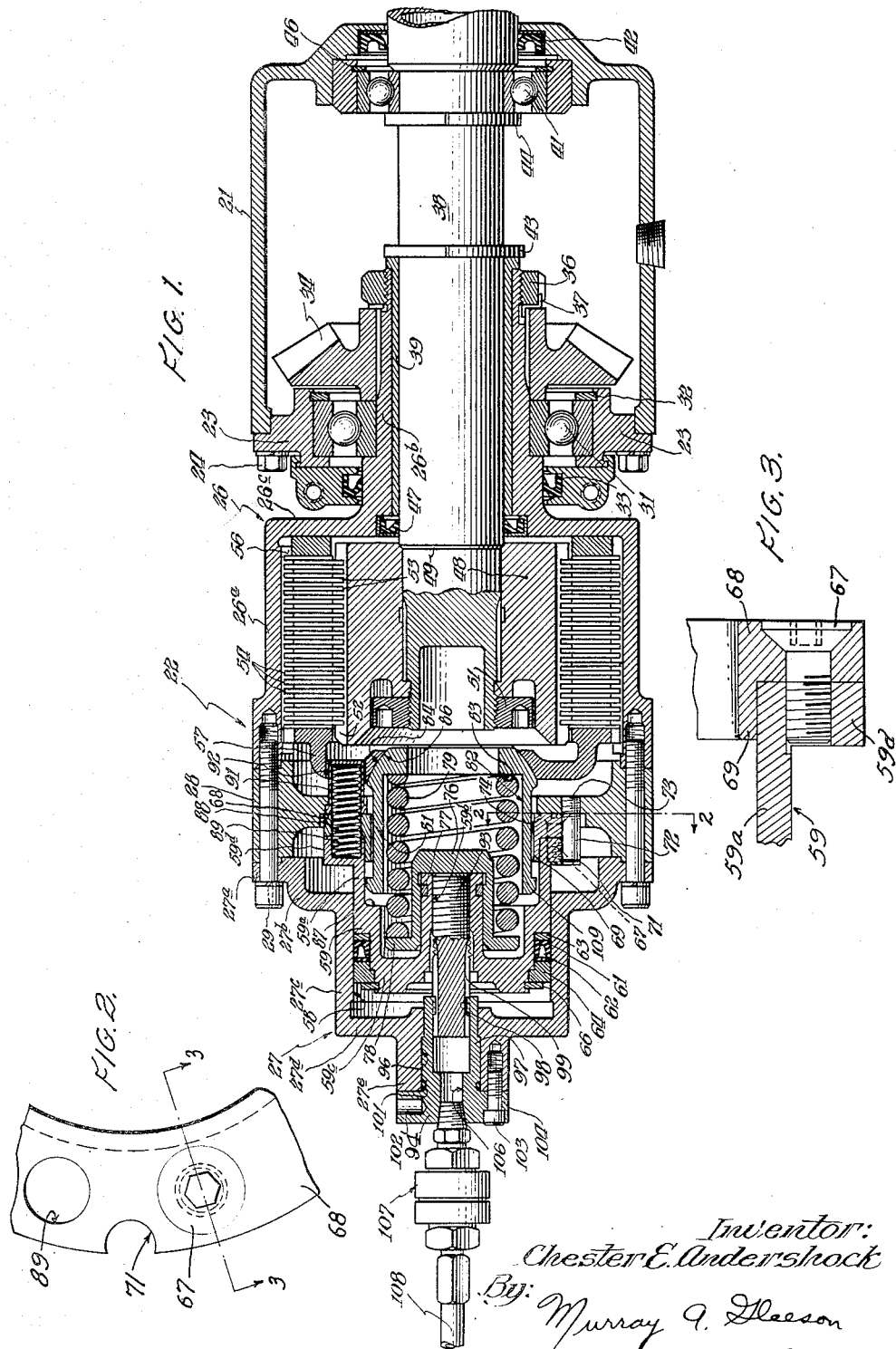
Inventor:
Chester E. Andershock
By: Murray G. Gleeson
Attorney.

United States Patent Office 2,702,619
Patented Feb. 22, 1955

2,702,619

OVERLOAD SLIP CLUTCH

Chester E. Andershock, Chicago, Ill., assignor to Goodman Manufacturing Company, Chicago, Ill., a corporation of Illinois Application July 18, 1951, Serial No. 237,424

5 Claims. (Cl. 192—85)

This invention relates generally to clutches and more particularly to an improved overload release clutch such as may be used advantageously in the drive mechanism for the gathering head of an underground mining and loading machine, continuous miner, or the like.

An object of the invention is the provision of such an overload release clutch which is hydraulically operated but in which the overload actuation is independent of variations in the hydraulic operating pressure.

Other objects include the provision of an overload release clutch of improved compactness, ruggedness and consistency in performance over a long period of time under the severe operating conditions which are normally found in underground mine service.

Other objects and advantages will be seen from the following description taken in connection with the drawing in which:

Figure 1 is a longitudinal sectional view of a preferred form of the present invention;

Fig. 2 is a fragmentary view of Fig. 1 taken along the line 2—2; and

Fig. 3 is a sectional view of Fig. 2 taken along the line 3—3.

Referring now more particularly to the drawing, a housing 21 represents a mining machine or other apparatus with which the invention is used. A clutch casing 22 is rotatably mounted in the housing by a detailed construction which will now be described.

First, it will be observed that the housing 21 has an open end which is closed by means of a plate 23, held in place by bolts 24. The casing 22 includes a shell portion 26 which is made up of large and small tubular sections 26a and 26b connected by shoulder 26c. The casing, generally designated 22, also includes an end cover 27 which comprises integral tubular and shoulder portions 27a, 27b, 27c, 27d and 27e. And the casing also includes an intermediate mounting member 28, the latter being connected between the end shells 26 and 27 by bolts 29.

The casing assembly, generally designated 22, is rotatably mounted in the housing 21 by means of ball bearing 31 which is interposed between the section 26b and the end plate 23. The bearing 31 is held in place by a snap ring 32 and a grease retainer 33 is interposed between the casing section 26b and plate 23. A driving gear 34 for the casing 22 is fixed on the end of the section 26b and is held in place by nut 36 and lock washer 37.

A driven shaft 38 is rotatably mounted within the casing 22, being rotatably journaled within a sleeve bearing 39 within the section 26b and, at the righthand end being rotatably guided within a ball bearing 41 mounted within the end of the housing 21. The righthand end of the driven shaft 38 extends through a grease retainer 42 and exteriorly of the housing 21 where it may connect to the apparatus being driven, for example the gathering chains of a gathering type loading machine (not shown). Likewise, it will be understood that the driving gear 34 will be drivably connected with a motor or other suitable source of power (not shown).

Also, it will be apparent as the description proceeds that the drive, if desired, may be reversed with the motor connected to feed power into the shaft 38 directly. It is only for convenience of nomenclature that the gear 34 is designated as a "driving" gear and the shaft 38 designated as "driven."

Leftwise end play of the shaft 38 is restricted by the snap ring 43 and rightwise end play is restricted by the snap ring 44. The ball bearing 41 is held in place against the latter shoulder by means of a snap ring 46.

At an intermediate point along the shaft 38, a grease retainer 47 is inset into the section 26c to prevent oil for the bearing 39 leaking leftwise into the clutch compartment now to be described.

The left end of the shaft 38 extends into the clutch disc compartment within the section 26a and it has a hub 48 splined thereon and held against endwise movement between shoulder 49 and nut 51. The exterior surface of the hub 48 is provided with a series of longitudinal splines 52. Inner clutch plates 53 are toothed in the usual manner for slidable movement along the splines 52 and for rotation with the shaft 38. Outer, alternate clutch discs 54 are similarly engaged with splines 56 formed in the casing section 26a and rotate with the casing.

So far, the structure described is conventional and is set forth merely to provide a complete environment for the invention.

A pressure plate 57 is also splined, like the discs 54, for rotation with the casing, and is effective to press the clutch discs 53 and 54 together whenever the clutch is applied so as to cause the casing 22 and the shaft 38 to rotate together.

The casing section 27c is provided with a concentric bore 58 within which is reciprocably movable an operating piston 59. The clearance between the bore and piston is sealed by means of a pressure sealing rubber-like gasket 61, spacer rings 62 and 63, a retainer ring 64 and a snap ring 66.

As stated, the piston 59 is hollow comprising generally an outer tubular section 59a, an inner tubular section 59b, and a connecting end wall 59c at the head or pressure end. The piston is provided with an outer, flanged portion 59d to which is mounted, as by means of a plurality of screws 67, a split collar 68 having a lip 69 extending internally of the piston for purpose to be described.

To prevent the piston from rotating relative to the casing, the flange 59d and a corresponding portion of the ring 68 are formed with a longitudinally extending external slot 71 engaging a pin 72 threaded into the intermediate casing member 28 as at 73.

Stops are provided in the casing to limit axial movement of the piston in both directions. In the drawing, the piston is shown in its extreme right end position against the stop shoulder 74 formed in the casing members 28. Movement in the opposite direction is limited by engagement of the head end of the piston with the casing end wall 27d.

An adjusting carrier 76 is telescopically mounted over the inner extension 59b of the piston, an oil seal 77 being interposed. The adjusting carrier 76 is provided with a flange 78 comprising a seat for one end of a clutch loading spring 79, to be described subsequently.

A cup-shaped thrust member 81 has a bore 82 for receiving the spring 79 and has a seat 83 against which the end of the spring opposite the seat 78 is seated. The end of the thrust member is provided with a universal pivotal connection with the pressure plate 57. In this case the connection includes mating ball and socket surfaces 84 and 86 respectively. The thrust member 81 is limitedly movable relative to the piston 59, being limited against leftwise movement by a stop shoulder 87 in the piston and being limited against rightwise movement by the lip 69 of the ring or collar 68.

Unloading spring means, comprising in this case a plurality of compression springs 88 interposed between the piston and the casing, are effective to urge the piston in a direction to move the thrust member to relieve load from the pressure plate. In this case the specific construction comprises a seated bore 89 formed through the piston flange 59d and the collar 68 at intervals around the periphery of the piston (only one spring 88 is shown in the drawing). The opposite end of each unloading spring 88 is seated within a cup-shaped retainer 91 mounted in the intermediate casing member 28. Openings 92 are provided at properly spaced intervals in the pressure plate 57 to provide clearance for the retainers 91.

An adjusting screw 93 is threadedly engaged within the piston extension 59b and extends therethrough into abutting relationship with the adjusting carrier 76. Rotation of the screw 93 relative to the piston moves the carrier 76 in and out to adjustably vary the compression of the loading spring 79, thereby adjustably varying the overload torque condition at which the clutch plates will begin to slip.

A hollow adjusting shaft or tube 94 is rotatably journaled within a bore 96 formed in the end of the casing. The internal tubular extension 97 thereof has a short spline 98 meshed with a relatively long spline 99 on the adjusting screw so as to adjustably vary the inward position of the adjusting screw by simply rotating the shaft 94. An oil seal 101 is provided between the shaft 94 and the bore 96. To facilitate rotating the adjusting shaft, a radial opening 102 is provided for reception of a spanner wrench or other tool. A series of cap screws, suitably arranged about the periphery of the adjusting shaft flange 104 and threaded into the casing, provides for fixing the shaft in a plurality of rotated positions to adjustably vary the compression of the loading spring 79 in fine increments over a wide range.

Screwed into the inner bore 106 of the adjusting shaft is the end of a rotary coupling joint 107 connected by a hose 108 to a source of fluid under pressure (not shown). Thus it will be seen that when pressure is introduced through the hose 108 by suitable valving, also not shown, it will be admitted to the head end of the piston 59 through a passageway within the casing which includes the splined interface 98—99 between the adjusting shaft and adjusting screw. This splined interface will be provided with sufficient fluid conductive capacity by reason of a relatively loose connection between the splines 98 and 99. By this novel arrangement of transmitting working pressure to the piston, considerable space is saved and an uncommonly compact design is achieved.

In operation, when pressure is admitted to the head end of the piston as aforesaid, it will be displaced to the right, against the compression of the springs 88, until it is stopped by abutment with the stop surface 74. This position is shown in the drawing where it will be seen that the loading spring 79 is compressed against the bottom of the thrust member 81, whence the load is transmitted through the pressure plate to the stack of clutch discs. Compression of the loading spring 79 is accommodated by leftwise shifting of the thrust member 81 relative to the piston 59 as is permitted by the range of movement between stops 87 and 69. The operating pressure supplied to the hose 108 will preferably be selected considerably in excess of that necessary to shift the piston against its stop 74 so that it will remain in that position even under wide pressure variations in the operating fluid. For example, assuming one hundred pounds per square inch is necessary to shift the piston against its stop 74, then, if an operating pressure in the hose 108 is selected at, say, three hundred pounds per square inch, the operating pressure can drop to a third of its nominal value and can increase to any extent (within the strength limits of the casing) without affecting the overload condition of the clutch.

In further describing the operation, assume that the pressure has been applied to the piston as aforesaid and drive through the clutch from the gear 34 to the shaft 38 is proceeding normally when something happens to freeze the clutch 38. The transmitted torque instantly rises to the value corresponding to the setting of the loading spring 79 and the clutch plates slip with the casing 22 rotating while the shaft 38 remains stationary. If the abnormality is temporary or quickly corrects itself, driving of the shaft 38 is automatically resumed. If the shaft remains frozen then the operator will stop the machine to correct the trouble.

When the pressure is released, fluid will flow backward through the hose 108 as the piston 59 is returned, leftwise, under the urgence of springs 79 and 88. Actually the spring 79 will be effective to move the piston only until the thrust member flange 109 contacts the stop 69 in the piston. Thence, the piston, thrust member 81, carrier 76 and loading spring 79, will be moved as a unit, leftwise, until the head end of the piston abuts the end wall 27d of the casing. This will positively draw the end of the thrust member away from the pressure plate 57, permitting the latter to shift leftwise to free the clutch plates.

While one form in which the present invention may be embodied has been shown and described it will be understood that various modifications and variations thereof may be effected without departing from the spirit and scope of the invention as defined by the appended claims.

I claim:

1. An overload slip clutch comprising: a rotatable casing; a shaft rotatably mounted within said casing; clutch means acting between said casing and shaft; a pressure plate splined to said casing and axially shiftable into and out of engagement with said clutch means; said casing having a bore concentric with the rotational axis thereof; a hollow piston mounted within said bore and having means securing it against rotation relative to the casing; stops in said casing engageable with said piston limiting axial movement of the latter in both directions; said piston having an axial extension of reduced diameter therewithin; a flanged, cup-shaped adjusting carrier reciprocably mounted over the end of said extension; a cup-shaped thrust member axially slidable within said piston and having ball and socket engagement with said pressure plate; stops in said piston engageable with said thrust member to limit relative axial movement in both directions; a clutch loading spring compressibly interposed between said thrust member and adjusting carrier; unloading spring means acting between said casing and said piston and urging said piston in a direction to move said thrust member to relieve load from said pressure plate; an adjusting screw threadedly engaged within said piston extension and abutting said adjusting carrier; an adjusting tube rotatably mounted in said casing and splined to said adjusting screw and connected to a source of fluid under pressure; said casing having therewithin a pressure passageway leading from said adjusting tube, through the splined interface between the adjusting tube and screw, and into the head end of the piston.

2. An overload slip clutch comprising: a rotatable casing; a shaft rotatably mounted within said casing; clutch means acting between said casing and shaft; a pressure plate operatively associated with said clutch means; said casing having a bore concentric with the rotational axis thereof; a piston reciprocable within said bore; stops in said casing engageable with said piston limiting axial movement of the latter in both directions; said piston having an axial extension; a clutch adjusting carrier slidably mounted over an end portion of said extension; an internally bored thrust member operatively connected with said pressure plate through a universal connection; stops acting between said thrust member and piston to limit relative axial movement in both directions; a clutch loading spring compressibly interposed between said thrust member and adjusting carrier; unloading spring means acting between said casing and said piston and urging said piston in a direction to move said thrust member to relieve load from said pressure plate; an adjusting screw threadedly engaged within said piston extension and abutting said adjusting carrier; an adjusting tube rotatably mounted in said casing and splined to said adjusting screw and connected to a source of fluid under pressure; said casing having therewithin a pressure passageway leading from said adjusting tube, through the splined interface between the adjusting tube and screw, and into the head end of the piston.

3. An overload slip clutch comprising: a rotatable casing; a shaft rotatably mounted within said casing; clutch means acting between said casing and shaft; a pressure plate in said casing and operatively engageable with said clutch means; said casing having a bore concentric with the rotational axis thereof; a piston mounted within said bore and having means securing it against rotation relative to the casing; stops in said casing engageable with said piston limiting axial movement of the latter in both directions; an adjusting carrier supported on said piston for axial movement relative to said piston; a thrust member supported on said piston for relatively limited axial movement in both directions and operatively connected with said pressure plate to transmit thrust to said clutch means; a clutch loading spring compressibly interposed between said adjusting carrier and thrust member; unloading spring means acting between said casing and said piston and urging said piston in a direction to move said thrust member to unload said clutch means; an adjusting screw threadedly engaged with said piston and abutting said adjusting carrier; an adjusting tube rotatably mounted in said casing and splined to said adjusting screw and connected to a source of fluid under pressure; said casing having therewithin a pressure passageway leading from said adjusting tube, through the splined interface between the adjusting tube and screw, and into the pressure end of the piston.

4. An overload slip clutch comprising: a rotatable casing; a shaft rotatably mounted within said casing; clutch means acting between said casing and shaft; a pressure plate in said casing and operatively engageable with said clutch means; said casing having a bore concentric with the rotational axis thereof; a piston mounted within said bore and having means securing it against rotation relative to the casing; stops in said casing engageable with said piston limiting axial movement of the latter in both directions; an adjusting carrier carried by said piston and movable axially relative thereto; a thrust member supported on said piston for axial movement relative thereto and operatively connected with said pressure plate to transmit thrust to said clutch means; stops in said piston engageable with said thrust member to limit relative axial movement in both directions; a clutch loading spring compressibly interposed between said adjusting carrier and thrust member; unloading spring means acting between said casing and said piston and urging said piston in a direction to move said thrust member to unload said clutch means; an adjusting screw threadedly engaged within said piston extension and abutting said adjusting carrier; an adjusting shaft rotatably mounted in said casing and splined to said adjusting screw; means for fixing said adjusting shaft to the casing in a plurality of rotated adjusted positions; said casing having a pressure passageway therewithin connecting the head end of the piston with an exterior source of fluid under pressure.

5. An overload slip clutch comprising: a rotatable casing; a shaft rotatably mounted within said casing; clutch means acting between said casing and shaft; a pressure plate in said casing and operatively engageable with said clutch means; said casing having a bore concentric with the rotational axis thereof; a piston mounted within said bore and having means securing it against rotation relative to the casing; said piston having mounted for axial movement relative thereto an adjusting carrier and a thrust member, said adjusting carrier and thrust member having a spring compressibly interposed therebetween; an adjusting screw threadedly engaged with said piston and extending into abutting relation with said adjusting carrier; said thrust member being limitedly movable relative to said piston and being operatively engaged with said pressure plate; stops in said casing engageable with said piston limiting axial movement of the latter in both directions; spring means acting between said casing and said piston and urging said piston in a direction to move said thrust member to unload said clutch means; an adjusting shaft rotatably mounted within said casing and splined to said adjusting screw; means for fixing said adjusting shaft to the casing in a plurality of rotated adjusted positions; said casing having a pressure passageway therein connecting the head end of the piston with an exterior source of fluid under pressure.

References Cited in the file of this patent

UNITED STATES PATENTS

| | | |
|---|---|---|
| 2,457,801 | Ball | Jan. 4, 1949 |
| 2,593,521 | Ball | Apr. 22, 1952 |